United States Patent
Pan et al.

(10) Patent No.: US 9,766,749 B2
(45) Date of Patent: Sep. 19, 2017

(54) TOUCH DEVICE AND SENSING COMPENSATION METHOD

(71) Applicant: Industrial Technology Research Institute, Hsinchu (TW)

(72) Inventors: Yen-Lin Pan, Kaohsiung (TW);
Wei-Yen Lee, Taichung (TW);
Chang-Po Chao, Taipei (TW);
Hung-Ming Tsai, Taichung (TW);
Hsuan-Wen Peng, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 181 days.

(21) Appl. No.: 14/162,781

(22) Filed: Jan. 24, 2014

(65) Prior Publication Data

US 2014/0375600 A1    Dec. 25, 2014

(30) Foreign Application Priority Data

Jun. 20, 2013  (TW) .............................. 102121990 A

(51) Int. Cl.
| | | |
|---|---|---|
| G06F 3/041 | (2006.01) | |
| G06F 3/042 | (2006.01) | |
| G06F 3/043 | (2006.01) | |
| G06F 3/044 | (2006.01) | |
| G06F 3/045 | (2006.01) | |
| G06F 3/046 | (2006.01) | |
| G06F 3/047 | (2006.01) | |

(52) U.S. Cl.
CPC ............ *G06F 3/0418* (2013.01); *G06F 3/044* (2013.01)

(58) Field of Classification Search
CPC ........................................................ G06F 3/045

USPC .......... 345/174, 168–172; 361/679.08–679.2
See application file for complete search history.

(56) References Cited

U.S. PATENT DOCUMENTS

| | | | | |
|---|---|---|---|---|
| 4,375,015 A | * | 2/1983 | Chambers, Jr. ........ | H04B 1/586 379/345 |
| 4,980,920 A | * | 12/1990 | Noro ......................... | H03F 1/56 381/59 |
| 8,049,732 B2 | | 11/2011 | Hotelling et al. | |

(Continued)

FOREIGN PATENT DOCUMENTS

| | | |
|---|---|---|
| CN | 101715574 | 5/2010 |
| CN | 101937662 | 1/2011 |

(Continued)

OTHER PUBLICATIONS

Hwang et al., "A Highly Area-Efficient Controller for Capacitive Touch Screen Panel Systems," IEEE Transactions on Consumer Electronics, May 2010, pp. 1115-1122, vol. 56, No. 2.

(Continued)

*Primary Examiner* — Benjamin C Lee
*Assistant Examiner* — Jeffrey S Steinberg
(74) *Attorney, Agent, or Firm* — Jianq Chyun IP Office

(57) ABSTRACT

A touch device and a sensing compensation method are provided. The touch device may include a touch panel, a sensing compensation circuit and a sensing circuit. The sensing compensation circuit may be coupled to the touch panel for providing a compensation-impedance according to features of the touch panel. The sensing circuit may be coupled to the sensing compensation circuit. The sensing circuit receives touch information compensated by the sensing compensation circuit.

25 Claims, 9 Drawing Sheets

(56) References Cited

U.S. PATENT DOCUMENTS

| | | | |
|---|---|---|---|
| 8,054,300 B2 | 11/2011 | Bernstein | |
| 8,077,160 B2 | 12/2011 | Land et al. | |
| 2006/0194419 A1* | 8/2006 | Araki | C23C 16/24 438/489 |
| 2008/0158172 A1 | 7/2008 | Hotelling et al. | |
| 2009/0027136 A1* | 1/2009 | Traa | H03H 11/10 333/12 |
| 2009/0256817 A1* | 10/2009 | Perlin | G06F 3/0233 345/174 |
| 2010/0059294 A1 | 3/2010 | Elias et al. | |
| 2010/0110040 A1* | 5/2010 | Kim | G06F 3/0412 345/174 |
| 2011/0063229 A1* | 3/2011 | Krah | G06F 3/0418 345/173 |
| 2011/0242050 A1 | 10/2011 | Byun et al. | |
| 2011/0254511 A1* | 10/2011 | Tam | H02J 7/0068 320/162 |
| 2011/0273399 A1* | 11/2011 | Lee | G06F 3/0418 345/174 |
| 2013/0135249 A1 | 5/2013 | Chen et al. | |
| 2013/0249862 A1* | 9/2013 | Xu | H02J 3/00 345/174 |

FOREIGN PATENT DOCUMENTS

| | | |
|---|---|---|
| CN | 102236470 | 11/2011 |
| CN | 102687104 | 9/2012 |
| TW | 200802057 | 1/2008 |
| TW | 201019194 | 5/2010 |
| TW | 201110005 | 3/2011 |
| TW | 201122985 | 7/2011 |
| TW | 201128470 | 8/2011 |
| TW | 201243681 | 11/2012 |

OTHER PUBLICATIONS

Park et al., "Low Power Multi-Channel Capacitive Touch Sensing Unit using Capacitor to Time Conversion Method," 2012 IEEE International Symposium on Circuits and Systems (ISCAS), May 20-23, 2012, pp. 2003-2006.

Nam et al., "12×12 Capacitive Matrix Touch Sensing Unit for SoC Application in 0.18um CMOS process," 2009 International SoC Design Conference (ISOCC), Nov. 22-24, 2009, pp. 305-308.

Ko et al., "Low Noise Capacitive Sensor for Multi-touch Mobile handset's applications," IEEE Asian Solid-State Circuits Conference, Nov. 8-10, 2010, pp. 1-4.

Ouh et al., "A Programmable Mutual Capacitance Sensing Circuit for a Large-sized Touch Panel," 2012 IEEE International Symposium on Circuits and Systems (ISCAS), May 20-23, 2012, pp. 1395-1398.

Ruan et al., "A Multi-Touch Interface Circuit for a Large-Sized Capacitive Touch Panel," IEEE Sensors Conference, Nov. 1-4, 2010, pp. 309-314.

Lawrence Mayes, "The Field Effect Transistor as a Voltage Controlled Resistor," http://graffiti.virgin.net/ljmayes.mal/comp/vcr.htm, Oct. 18, 2002, pp. 1-3.

Fang et al., "Design, Simulation, and Characterization of Variable Inductor With Electrostatic Actuation Fabricated by Using Surface Micromachining Technology," IEEE Transactions on Electron Devices, Oct. 2010, pp. 2751-2755, vol. 57, No. 10.

Farinelli et al., "A Wide Tuning Range MEMS Varactor Based on a Toggle Push-Pull Mechanism," Proceedings of the 38th European Microwave Conference, Oct. 2008, pp. 1501-1504.

"Office Action of Taiwan Counterpart Application", dated Dec. 12, 2014, p. 1-p. 8, in which the listed references were cited.

"Office Action of China Counterpart Application," dated Sep. 26, 2016, p. 1-p. 10, in which the listed references were cited.

\* cited by examiner

TOUCH DEVICE AND SENSING COMPENSATION METHOD

CROSS-REFERENCE TO RELATED APPLICATION

This application claims the priority benefit of Taiwan application serial no. 102121990, filed on Jun. 20, 2013. The entirety of the above-mentioned patent application is hereby incorporated by reference herein and made a part of this specification.

TECHNICAL FIELD

The disclosure relates to a touch device and a sensing compensation method.

BACKGROUND

Following the vigorous development of smart phones and tablet computers, projected capacitive touch panels have gradually taken the places of the conditional keyboards and mice and become the major input interfaces. Either the projected capacitive touch panels with small sizes or those with large sizes have a delay issue resulted from parasitic resistance and parasitic capacitance. The delay issue caused by the parasitic resistance and the parasitic capacitance leads to signal bandwidth limitation. Overly large parasitic resistance and parasitic capacitance would leads to the reduction of the sensitivity for sensing change in mutual capacitance of touch units in the touch panel, and as a result, a signal-to-noise ratio (SNR) of a sensing signal may be decreased.

SUMMARY

An embodiment of the disclosure introduces a touch device. The touch device may include a touch panel, a sensing compensation circuit and a sensing circuit. The sensing compensation circuit is coupled to the touch panel and provides a compensation-impedance according to features of the touch panel. The sensing circuit is coupled to the sensing compensation circuit and receives touch information compensated by the sensing compensation circuit.

An embodiment of the disclosure introduces a sensing compensation method for a touch device. The method may include providing a touch panel, providing a compensation-impedance by a sensing compensation circuit according to features of the touch panel and receiving touch information by a sensing circuit, where in the touch information being may be compensated by the sensing compensation circuit.

Several exemplary embodiments accompanied with figures are described in detail below to further describe the disclosure in details.

BRIEF DESCRIPTION OF DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
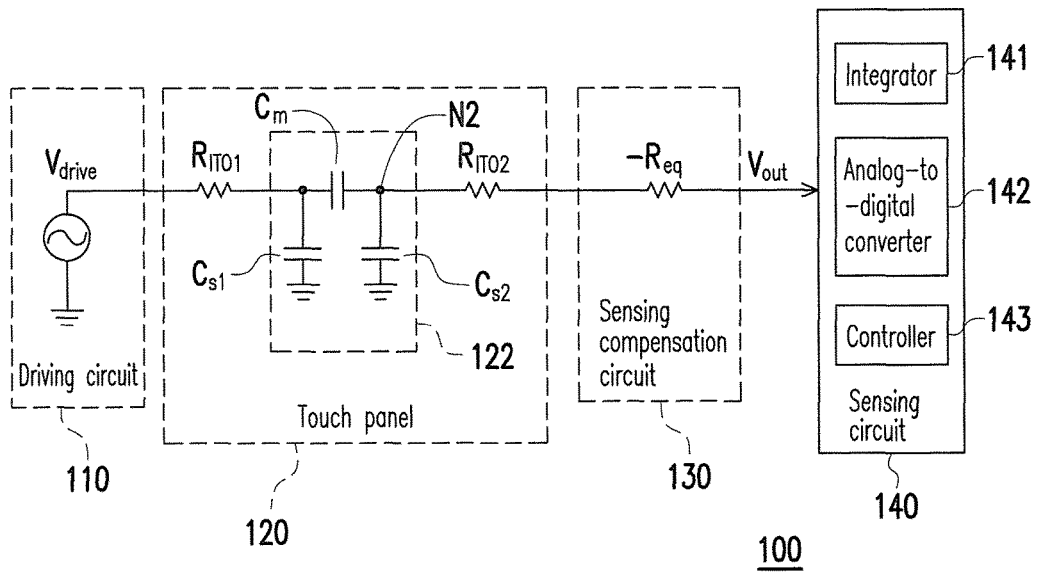
FIG. 1 is a schematic diagram illustrating an equivalent circuit of a touch device according to an exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a first device is coupled to a second device" may be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a schematic diagram illustrating an equivalent circuit of a touch device 100 according to an exemplary embodiment of the disclosure. The touch device 100 includes a driving circuit 110, a touch panel 120, a sensing compensation circuit 130 and a sensing circuit 140. The sensing compensation circuit 130 is coupled to the touch panel 120. The sensing compensation circuit 130 provides a compensation-impedance according to features of the touch panel 120. The sensing circuit 140 is coupled to the sensing compensation circuit 130. The sensing circuit 140 receives touch information compensated by the sensing compensation circuit 130.

The touch panel 120 is disposed with one or more touch units (e.g. a touch unit 122) so as to sense whether a touch event occurs on the touch panel 120. According to different design requirements, the touch unit 122 may have various layout structure designs. FIG. 1 illustrates an equivalent circuit of the touch unit 122. The touch unit 122 has a first electrode and a second electrode. The first electrode and the second electrode form a mutual capacitor $C_m$ with each other. The first electrode and a drive line have a parasitic capacitance $C_{s1}$, while the second electrode and a sense line have a parasitic capacitance $C_{s2}$. The aforementioned parasitic capacitances may also be referred to as stray capacitors. Based on different design requirements, the first electrode and the second electrode may be transparent electrodes, semi-transparent electrodes or non-transparent electrode. For instance, in the present exemplary embodiment, the first electrode and the second electrode may be implemented by utilizing indium tin oxide (ITO).

The touch panel 120 is disposed with one ore more drive lines. The driving circuit 110 may be coupled to a first electrode of the touch unit 122 through the drive line. The drive line has an impedance $R_{ITO1}$. The touch panel 120 may also be disposed with one ore more sense line. The second electrode of the touch unit 122 is coupled to the sense lines. The sense lines have an impedance $R_{ITO2}$. A sensing terminal of the sensing compensation circuit 130 is coupled to the sense lines of the touch panel 120 to sense touch information of the touch unit 122 in the touch panel 120. Based on different design requirements, the drive lines and the sense lines may be transparent conduction lines, semi-transparent conduction lines or non-transparent conduction lines. For instance, in the present exemplary embodiment, the drive lines and the sense lines may be implemented by utilizing ITO conduction lines.

In the sensing operation of the touch unit 122, the driving circuit 110 provides a driving signal $V_{drive}$ through the drive line to the first electrode of the touch unit 122, and the sensing compensation circuit 130 synchronously senses the touch information of the touch unit 122 using the sense lines. In the touch panel 120, the impedance $R_{ITO2}$ would possibly be increased due to an overly long length (and/or an overly thin line diameter) of a sense line, and time delay caused by the impedance $R_{ITO2}$ and the parasitic capacitance $C_{s2}$ would result in signal bandwidth limitation that can not be ignored.

In the present exemplary embodiment, the sensing terminal of the sensing compensation circuit 130 may provide a negative input impedance $-R_{eq}$. The negative input impedance $-R_{eq}$ provided by the sensing compensation circuit 130 may compensate the impedance $R_{ITO2}$ of the sense lines in the touch panel 120 and may be determined according to actual product design requirements. For instance, an absolute value of the negative input impedance $-R_{eq}$ (i.e., $|-R_{eq}|$) may be set to be within a certain impedance range defined according to the impedance $R_{ITO2}$ of the sense lines. For example, according to a design requirement, a tolerable error value $\Delta R$ may be determined, and the impedance range may be from $R_{ITO2}-\Delta R$ to $R_{ITO2}+\Delta R$. In the present exemplary embodiment, the absolute value of the negative input impedance $-R_{eq}$ may be equal to the impedance $R_{ITO2}$ of the sense lines.

Since the sensing compensation circuit 130 may provide the negative input impedance $-R_{eq}$, an impedance on a sensing path of the sensing compensation circuit 130 to the touch unit 122 is $R_{ITO2}+(-R_{eq})$. Therefore, the sensing compensation circuit 130 may offset/compensate the impedance of the sense line $R_{ITO2}$ in the touch panel 120 so as to lower the bandwidth limitation on sensing signals resulted from the impedance $R_{ITO2}$ and the parasitic capacitance $C_{s2}$ and increase a speed for sensing the touch panel 120. Moreover, by the negative input impedance $-R_{eq}$ offsetting/compensating the impedance $R_{ITO2}$ of the sense lines, the sensitivity for the sensing compensation circuit 130 sensing change of a mutual capacitance $C_m$ may be enhanced, and thereby a signal-to-noise ratio (SNR) of the sensing signal may be increased.

A result (i.e., an output signal $V_{out}$) for the sensing compensation circuit 130 sensing the sense line is sent to the sensing circuit 140. Based on different design requirements on products, the sensing circuit 140 may be designed and configured in various ways. For instance, in some exemplary embodiments, the sensing circuit 140 may be disposed with an integrator 141, an analog-to-digital converter 142 and a controller 143. The integrator 141 may receive the output signal $V_{out}$ and correspondingly output an integration result to the analog-to-digital converter 142. The analog-to-digital converter 142 may convert an analog output from the integrator 141 into a digital code and sends the digital code to the controller 143. The controller 143 may check the digital code and determine whether a touch event occurs in the touch unit 122 according to the checking result. In other exemplary embodiments, the sensing circuit 140 is not limited thereto.

Figure 2:
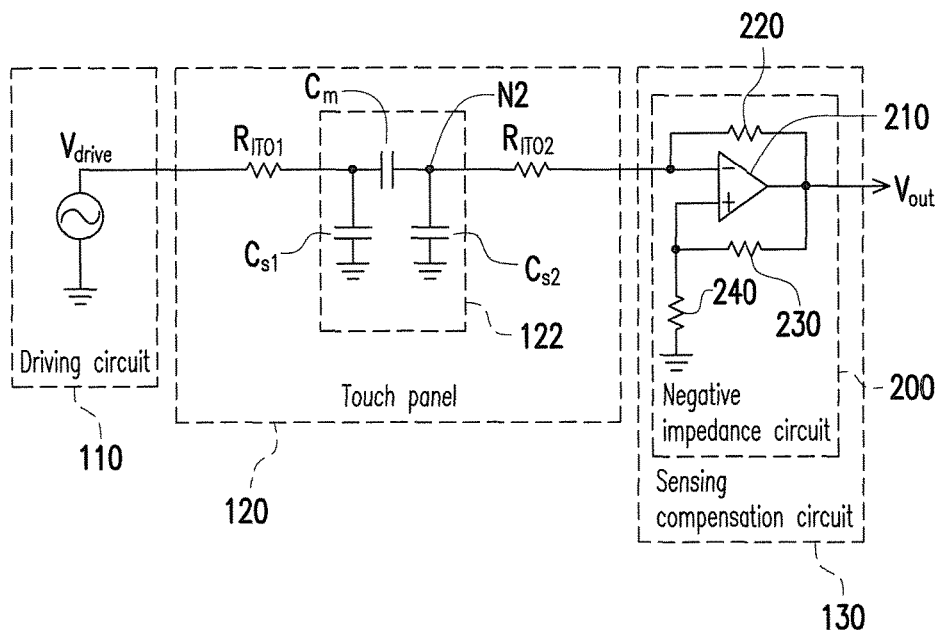
FIG. 2 is a circuit schematic diagram illustrating the sensing compensation circuit depicted in FIG. 1 according to an exemplary embodiment of the disclosure.

FIG. 2 is a circuit schematic diagram illustrating the sensing compensation circuit 130 depicted in FIG. 1 according to an exemplary embodiment of the disclosure. Related descriptions of FIG. 2 can be referred for the exemplary embodiment of FIG. 1. With reference to FIG. 2, the sensing compensation circuit 130 includes a negative impedance circuit 200. An input terminal of the negative impedance circuit 200 is coupled to the sensing terminal of the sensing compensation circuit 130. An output terminal of the negative impedance circuit 200 provides the touch information of the touch unit 122. The input terminal of the negative impedance circuit 200 provides the negative input impedance $-R_{eq}$.

In the present exemplary embodiment, the negative impedance circuit 200 includes an amplifier 210, a first impedance 220, a second impedance 230 and a third impedance 240. In the present exemplary embodiment, a first input terminal of the amplifier 210 is an inverted input terminal, while a second input terminal of the amplifier 210 is a non-inverted input terminal. In other present exemplary embodiments, the first input terminal of the amplifier 210 is a non-inverted input terminal, while the second input terminal of the amplifier 210 is an inverted input terminal. The first input terminal of the amplifier 210 is coupled to the input terminal of the negative impedance circuit 200, and an output terminal of the amplifier 210 is coupled to the output terminal of the negative impedance circuit 200.

A first terminal and a second terminal of the first impedance 220 are respectively coupled to the first input terminal and the output terminal of the amplifier 210. A first terminal and a second terminal of the second impedance 230 are respectively coupled to the second input terminal and the output terminal of the amplifier 210. In the present exemplary embodiment, a first terminal and a second terminal of the third impedance 240 are respectively coupled to the second input terminal of the amplifier 210 and a reference voltage (e.g. a ground voltage or any other constant voltage). One of the first impedance 220, the second impedance 230 and the third impedance 240 is a first impedance unit. The first impedance unit comprises a resistor, a variable resistor, a capacitor, a variable capacitor, an inductor, a variable inductor or any other type of impedance. In the present exemplary embodiment, for example, the first impedance 220, the second impedance 230 and the third impedance 240 may be any type of resistors. In other present exemplary embodiments, the first impedance 220, the second impedance 230 and/or the third impedance 240 may be a capacitor, an inductor or any other impedance.

Given that the first impedance 220 has a resistance $R_1$, the second impedance 230 has a resistance $R_2$, the third impedance 240 has a resistance $R_3$, while the amplifier 210 may be assumed as an ideal amplifier, them an equivalent input impedance $R_{eq}$ of the negative impedance circuit 200 is calculated by an equation, $R_{eq}=-(R_1R_3)/R_2$. When the equivalent input impedance $R_{eq}$ of the negative impedance circuit 200 is identical to the impedance $R_{ITO2}$ of the sense lines, a sensing electrode (e.g. a node N2 shown in FIG. 2) of the touch unit 122 may present a virtual short circuit state, such that impact from the impedance $R_{ITO2}$ of the sense lines and the parasitic capacitance $C_{s2}$ may be eliminated/improved. When the node N2 is in the virtual short circuit state, a relationship between the driving signal $V_{drive}$ of the driving circuit 110 and the output signal $V_{out}$ of the sensing compensation circuit 130 may be expressed by $[V_{out}(j\omega)/V_{drive}(j\omega)]=-\{[j\omega^*C_m^*R_{ITO2}]/[1+j\omega(C_{s1}+C_m)R_{ITO1}]\}^*[1+(R_2/R_3)]$, and a relationship among $R_1$, $R_2$, $R_3$ and $R_{ITO2}$ may be expressed by $(R_1R_3)/R_2=R_{ITO2}$.

Given that $R_1=R_{ITO2}$, when a frequency $\omega$ of the driving signal $V_{drive}$ is quite high, a relationship between the output signal $V_{out}$ of the sensing compensation circuit 130 and the driving signal $V_{drive}$ of the driving circuit 110 may be expressed by $[V_{out}(j\omega)/V_{drive}(j\omega)]=-\{[j\omega^*C_m^*R_{ITO2}]/[1+j\omega(C_{s1}+C_m)R_{ITO1}]\}^*[1+(R_2/R_3)] \approx -[C_m/(C_{s1}+C_m)]^*(R_{ITO2}/R_{ITO1})^*(1+R_2/R_3)$. Since the touch device 100 is capable of eliminating/improving the impact of the impedance $R_{ITO2}$ of the sense lines, a bandwidth and a sensing speed of the sensing compensation circuit 130 may be increased. Moreover, by adjusting a ratio of $R_2$ to $R_3$ (e.g. setting $R_2>R_3$), a change value of the mutual capacitor $C_m$ may be enlarged, and the impact from the impedance $R_{ITO2}$ of the sense lines may be eliminated. In addition, the touch device 100 may use the driving signal $V_{drive}$ having a lower voltage.

Figure 3:
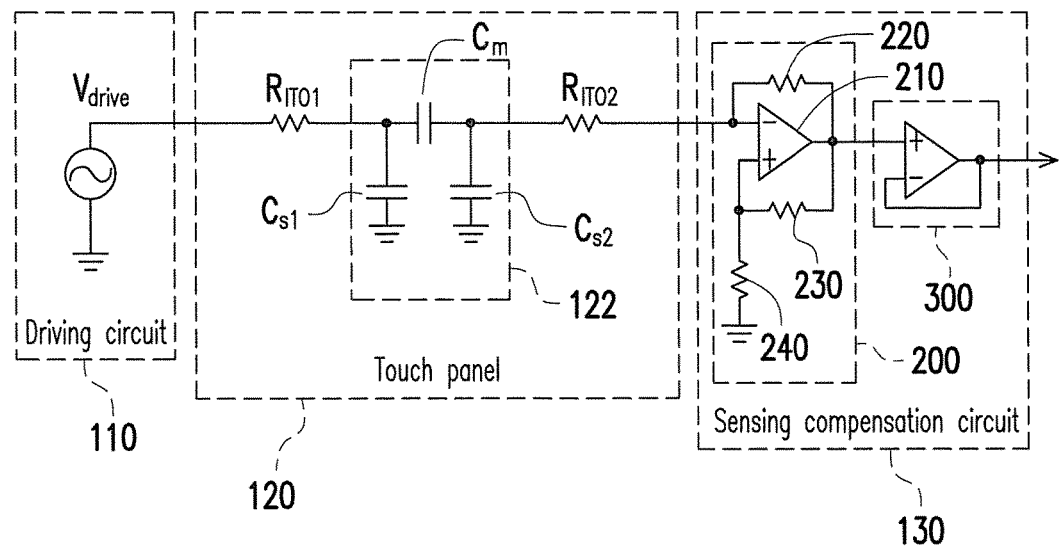
FIG. 3 is a circuit schematic diagram illustrating the sensing compensation circuit depicted in FIG. 1 according to another exemplary embodiment of the disclosure.

FIG. 3 is a circuit schematic diagram illustrating the sensing compensation circuit 130 depicted in FIG. 1 according to another exemplary embodiment of the disclosure. Related descriptions of FIG. 3 can be referred for the exemplary embodiments of FIG. 1 and FIG. 2. Differing from the exemplary embodiment illustrated in FIG. 2, the sensing compensation circuit 130 of the exemplary embodiment illustrated in FIG. 3 further includes a buffer 300. With reference to FIG. 3, an input terminal of the buffer 300 is coupled to the output terminal of the negative impedance circuit 200. An ideal input impedance of the buffer 300 is infinitely large, and thus, a load effect of the negative impedance circuit 200 may be improved. The implementation of the buffer 300 may atop various circuit designs according to design requirements. For example, in some exemplary embodiments, a unit gain amplifier, a sense amplifier or any other buffer circuit/amplifier circuit may be adopted to implement the buffer 300.

Figure 4:
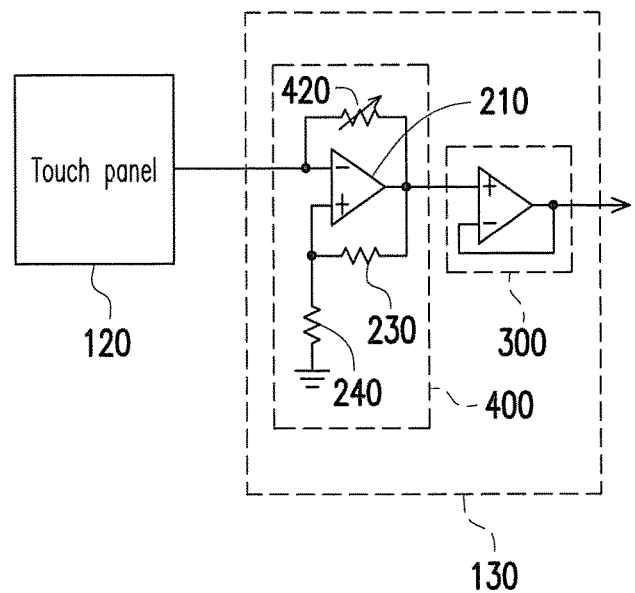
FIG. 4 is a circuit schematic diagram illustrating the sensing compensation circuit depicted in FIG. 1 according to still another exemplary embodiment of the disclosure.

FIG. 4 is a circuit schematic diagram illustrating the sensing compensation circuit 130 depicted in FIG. 1 according to still another exemplary embodiment of the disclosure. Related descriptions of FIG. 4 can be referred for the exemplary embodiments of FIG. 1, FIG. 2 and FIG. 3. For example, a negative impedance circuit 400 illustrated in FIG. 4 may be likewise embodied with reference to the description of the negative impedance circuit 200 of FIG. 2 and FIG. 3. Differing from the exemplary embodiment illustrated in FIG. 3, a negative impedance circuit 400 illustrated in FIG. 4 has a first impedance 420 including a variable resistor. With reference to FIG. 4, a first terminal and a second terminal of the first impedance 420 are respectively coupled to the first input terminal and the output terminal of the amplifier 210. Here, it is assumed that first impedance 420 has a resistance $R_1$, the second impedance 230 has a resistance $R_2$, and the third impedance 240 has a resistance $R_3$. Since the equivalent input impedance $R_{eq}$ of the negative impedance circuit 400 is calculated by the equation $R_{eq}=-(R_1R_3)/R_2$, the negative input impedance $-R_{eq}$ of the negative impedance circuit 400 is capable of being adjusted by adjusting a resistance of the first impedance 420 as $R_1$ so as to be adaptive to the impedance $R_{ITO2}$ of different sense lines of different types of touch panel 120. By offsetting/compensating the impedance $R_{ITO2}$ of the sense lines with the adjusted negative input impedance $-R_{eq}$, the sensitivity for the sensing compensation circuit 130 sensing the change of the mutual capacitance $C_m$ may be enhanced and thereby increase the SNR of the sensing signal.

The touch panel 120 may be formed by a plurality of touch units 122 arranged in an array. First electrodes of the touch units 122 belonging to different columns are electrically connected to different lines respectively, while second electrodes of the touch units 122 belonging to different rows are electrically connected to different sense lines respectively. Alternatively, the first electrodes of the touch units 122 belonging to different rows are electrically connected to different drive lines respectively, while the second electrodes of the touch units 122 belonging to different columns are electrically connected to different sense lines respectively. Different sense lines may have different impedances $R_{ITO2}$. The touch units 122 at different positions on the same sense line also have different impedance $R_{ITO2}$. When the touch units 122 of the touch panel 120 is more, the number of resistance levels of the first impedance 420 is also more so as to offset/compensate the impedance $R_{ITO2}$ of the sense lines.

Figure 5:
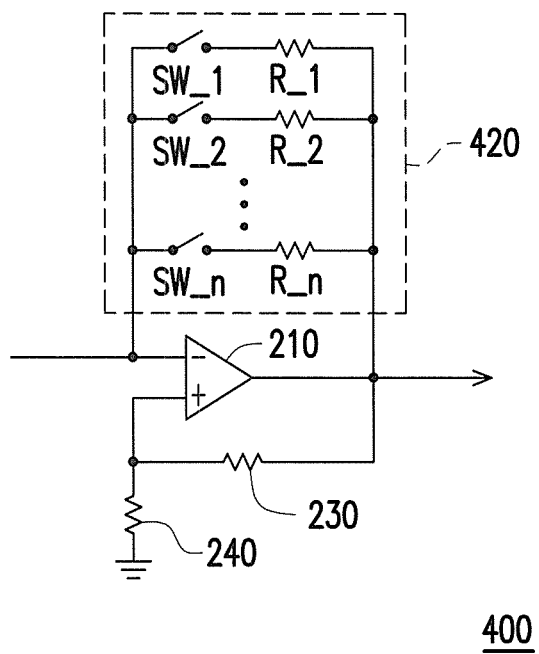
FIG. 5 is a circuit schematic diagram illustrating the negative impedance circuit depicted in FIG. 4 according to an exemplary embodiment of the disclosure.

The variable resistor of the first impedance 420 illustrated in FIG. 4 may be implemented in any way. The first impedance 420 may be a second impedance unit comprising a plurality of switches and a plurality of resistors. For instance, FIG. 5 is a circuit schematic diagram illustrating the negative impedance circuit 400 depicted in FIG. 4 according to an exemplary embodiment of the disclosure. Related descriptions of FIG. 5 can be referred for the exemplary embodiments of FIG. 4. With reference to FIG. 5, the variable resistor of the first impedance 420 includes a plurality of switches (e.g. switches SW_1, SW_2 . . . and SW_n shown in FIG. 5) and a plurality of resistors (e.g. resistors R_1, R_2 . . . and R_n shown in FIG. 5). First terminals of the switches SW_1~SW_n are jointly coupled to the first input terminal of the amplifier 210, and second terminals of the switches SW_1~SW_n are respectively coupled to first terminals of the resistors R_1~R_n in a one-to-one manner, and second terminals of the resistors R_$_{-1}$~R_n are jointly coupled to the output terminal of the amplifier 210. The resistors R_$_{-1}$~R_n respectively have the same or different resistance. By determining an on state of each of the switches SW_1~SW_n, the resistance of the first impedance 420 may be determined. The implementation of the second impedance 230 and/or the third impedance 240 illustrated in FIG. 5 may be embodied with reference to the related description of the first impedance 420 in other exemplary embodiment.

Figure 6:
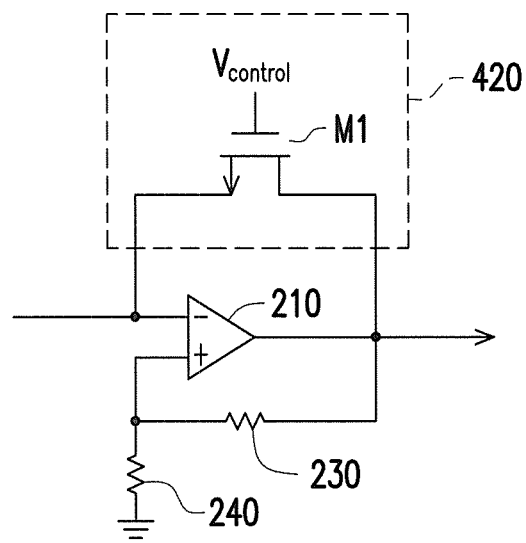
FIG. 6 is a circuit schematic diagram illustrating the negative impedance circuit depicted in FIG. 4 according to another exemplary embodiment of the disclosure.

The variable resistor of the first impedance 420 illustrated in FIG. 4 may be a third impedance unit comprising a transistor. For instance, FIG. 6 is a circuit schematic diagram illustrating the negative impedance circuit 400 depicted in FIG. 4 according to another exemplary embodiment of the disclosure. Related descriptions of FIG. 6 can be referred for the exemplary embodiments of FIG. 4. With reference to FIG. 6, the variable resistor of the first impedance 420 includes a transistor M1. A first terminal (e.g. a source terminal) of the transistor M1 is coupled to the first input terminal of the amplifier 210. A second terminal (e.g. a drain terminal) of the transistor M1 is coupled to the output terminal of the amplifier 210. A control terminal (e.g. a gate terminal) of the transistor M1 is coupled to the control voltage $V_{control}$. As such, the resistance of the first impedance 420 may be determined by determining a voltage level of the control voltage $V_{control}$. The implementation of the second impedance 230 and/or the third impedance 240 illustrated in FIG. 6 may be embodied with reference to the related description of the first impedance 420 in other exemplary embodiment.

Figure 7:
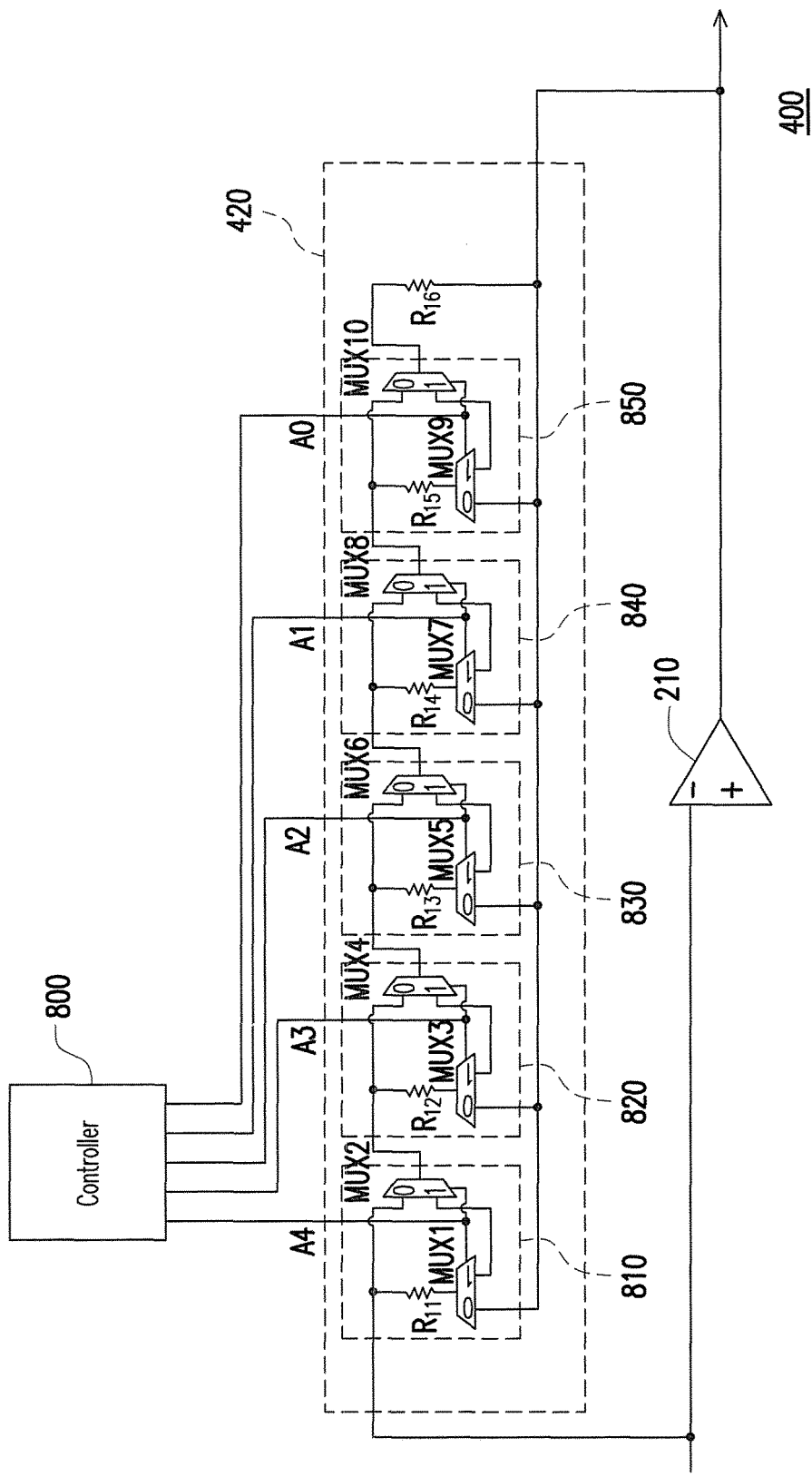
FIG. 7 is a circuit schematic diagram illustrating the first impedance of the negative impedance circuit depicted in FIG. 4 according to still another exemplary embodiment of the disclosure.

When the touch units 122 of the touch panel 120 are more, the number of resistance levels for the first impedance 420 becomes more. Thus, in order to save an area of an integrated circuit (IC), the reuse of the resistors has to be increased. In some exemplary embodiments, the reuse of the resistors may be increased by adjusting the configurations of the connection in series or in parallel of each resistor in the first impedance 420. For instance, the variable resistor of the first impedance 420 illustrated in FIG. 4 may be a fourth impedance unit comprising a plurality of controllable resistance units and a first resistor. The implementation of the second impedance 230 and/or the third impedance 240 may be embodied with reference to the related description of the first impedance 420 in other exemplary embodiment. FIG. 7 is a circuit schematic diagram illustrating the first impedance 420 of the negative impedance circuit 400 depicted in FIG. 4 according to still another exemplary embodiment of the disclosure. With reference to FIG. 4 and FIG. 7, the variable resistor of the first impedance 420 includes a plurality of controllable resistance units (e.g. controllable resistance units 810, 820, 830, 840 and 850 shown in FIG. 7) and the resistor $R_{16}$ to form a resistor switching array. A first terminal of the $n^{th}$ controllable resistance unit in the controllable resistance units 810~850 is coupled to a second terminal of the n-$1^{th}$ controllable resistance unit in the controllable resistance units 810~850. For example, a first terminal of the $2^{nd}$ controllable resistance unit 820 is coupled to a second terminal of the $1^{st}$ controllable resistance unit 810, while a first terminal of the $3^{rd}$ controllable resistance unit 830 is coupled to a second terminal of the $2^{nd}$ controllable resistance unit 820. The first terminal of the $1^{st}$ controllable resistance unit 810 is coupled to the first input terminal (e.g. an inverted input terminal) of the amplifier 210. Third terminals of the controllable resistance units 810~850 are jointly coupled to the output terminal of the amplifier 210. A first terminal of the resistor $R_{16}$ is coupled to a second terminal of the last controllable resistance unit 850 in the controllable resistance units 810~850, and a second terminal of the resistor $R_{16}$ is coupled to the output terminal of the amplifier 210.

The controllable resistance unit 810 includes the resistor $R_{11}$, a multiplexer MUX1 and a multiplexer MUX2. A first terminal of the resistor $R_{11}$ is served as a first terminal of the controllable resistance unit 810, a common terminal of the multiplexer MUX1 is coupled to a second terminal of the resistor $R_{11}$, and a first select terminal of the multiplexer MUX1 is served as a third terminal of the controllable resistance unit 810. A first select terminal of the multiplexer MUX2 is coupled to the first terminal of the resistor $R_{11}$, a second select terminal of the multiplexer MUX2 is coupled to the second select terminal of the multiplexer MUX1, and a common terminal of the multiplexer MUX2 is served as the second terminal of the controllable resistance unit 810. Related descriptions of the controllable resistance units 820~850 may be embodied with reference to the controllable resistance unit 810. For instance, the controllable resistance unit 820 includes the resistor $R_{12}$, a multiplexer MUX3 and a multiplexer MUX4, the controllable resistance unit 830 includes the resistor $R_{13}$, a multiplexer MUX5 and a multiplexer MUX6, the controllable resistance unit 840 includes the resistor $R_{14}$, a multiplexer MUX7 and a multiplexer MUX8, and the controllable resistance unit 850 includes the resistor $R_{15}$, a multiplexer MUX9 and a multiplexer MUX10. Each of the controllable resistance units 810~850 utilizes, for example, a two-to-one multiplexer to switch between the configurations of the connection in series and the connection in parallel of each resistor.

The multiplexers MUX1~MUX10 are respectively controlled by control signals A0, A1, A2, A3 and A4 of a controller 800. When the control signals A0~A4 are equal to 0, the first input terminal of the amplifier 210 may be coupled to first terminals of the resistors $R_{11}$~$R_{16}$ through the multiplexers MUX2, MUX4, MUX6, MUX8 and MUX10, and the output terminal of the amplifier 210 may be coupled to second terminals of the resistors $R_{11}$~$R^{16}$ through the multiplexers MUX1, MUX3, MUX5, MUX7 and MUX9, wherein at this time, the coupling relationship among the resistors $R_{11}$~$R_{16}$ are parallel.

When the control signals A0~A4 are equal to 1, the second terminal of the resistor $R_{11}$ is coupled to the first terminal of the resistor $R_{12}$ through the multiplexer MUX1 and the multiplexer MUX2, the second terminal of the resistor $R_{12}$ is coupled to the first terminal of the resistor $R_{13}$ through the multiplexer MUX3 and the multiplexer MUX4, the second terminal of the resistor $R_{13}$ is coupled to the first terminal of the resistor $R_{14}$ through the multiplexer MUX5 and the multiplexer MUX6, the second terminal of the resistor $R_{14}$ is coupled to the first terminal of the resistor $R_{15}$ through the multiplexer MUX7 and the multiplexer MUX8, and the second terminal of the resistor $R_{15}$ is coupled to the first terminal of the resistor $R_{16}$ through the multiplexer MUX9 and the multiplexer MUX10, wherein at this time the coupling relationship among the resistors $R_{11}$~$R_{16}$ is the connection in series.

The resistor switching array circuit of the first impedance 420 determines the coupling relationship among the resistors $R_{11}$~$R_{16}$ through the control signals A0~A4. An equivalent resistor $R_{eqiv}$ of the first impedance 420 is expressed by $R_{eqiv}=R_{11}?(R_{12}?(R_{13}?(R_{14}?(R_{15}?R_{16}))))$, wherein "?" represents the connection in series or the connection in parallel (which is determined by the control signals A0~A4 output by the controller 800. For instance, in the example illustrated in FIG. 7, "?" represents the connection in series when the control signal is equal to 1 and represents in parallel when the control signal is equal to 0. In other present exemplary embodiments, it represents the connection in series when the control signal is equal to 0 and represents in parallel when the control signal is equal to 1.

For instance, with reference to FIG. 7, when the control signals A4, A3, A2, A1 and A0 are respectively 1, 1, 1, 1 and 0, the equivalent resistor $R_{eqiv}$ of the first impedance 420 is expressed by $R_{eqiv}=R_{11}+(R_{12}+(R_{13}+(R_{14}+(R_{15}\|R_{16}))))$, wherein "$\|$" represents in parallel. When the control signals A4, A3, A2, A1 and A0 are respectively 0, 1, 1, 1 and 0, the equivalent resistor $R_{eqiv}$ of the first impedance 420 is expressed by $R_{eqiv}=R_{11}|(R_{12}+(R_{13}+(R_{14}+(R_{15}\|R_{16}))))$.

Taking the first impedance 420 illustrated in FIG. 7 for example, the first impedance 420 has 5 controllable resistance units, and thus, $2^5$ (i.e., 32) types of resistance may be combined for the first impedance 420. Based on resistance settings of the resistors 32 different types of resistance may be obtained for the first impedance 420 so as to offset/compensate the impedance $R_{ITO2}$ of the sense lines. Likewise, if the first impedance 420 has N controllable resistance units, $2^N$ types of resistance may be combined for such circuit architecture.

Figure 15:
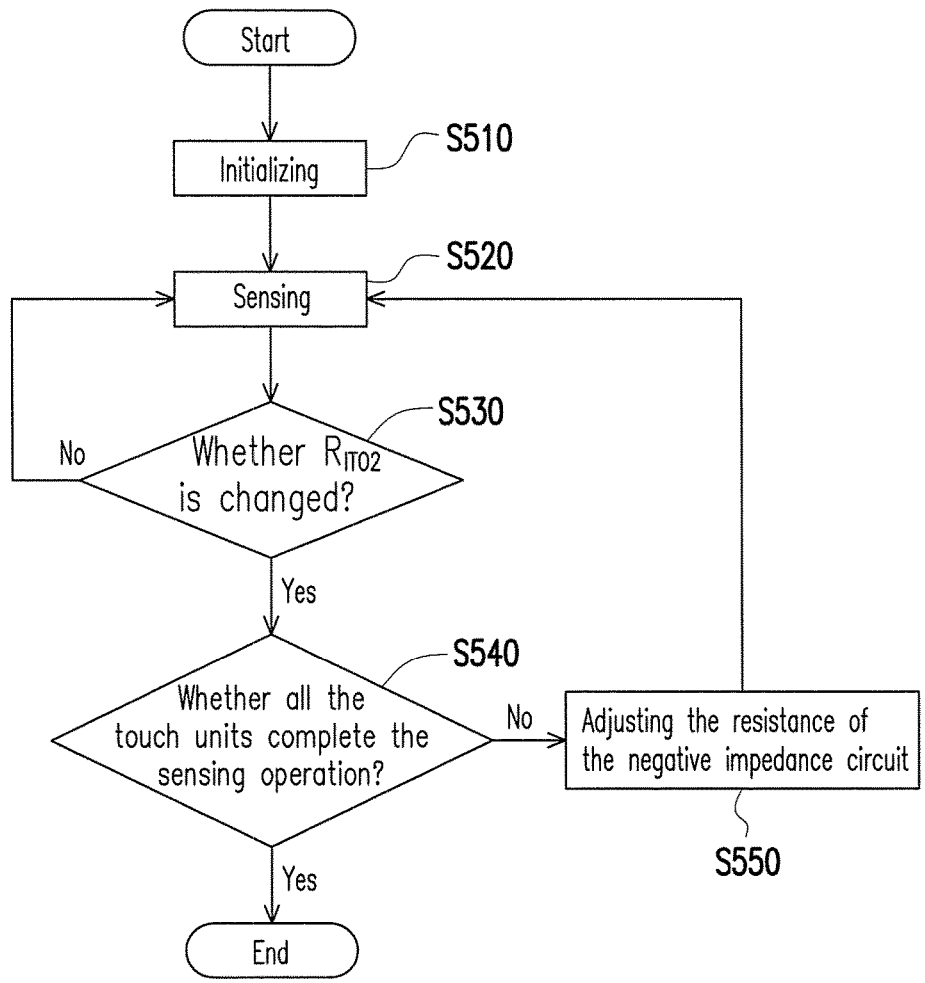
FIG. 15 is a schematic diagram showing a resistance controlling process of the compensation-impedance ($R_{eq}$) according to an exemplary embodiment of the disclosure.

The controller 800 may be a counter circuit or any other circuit. With reference to FIG. 15 and FIG. 7, before scanning and sensing the touch panel 120, the controller 800 may be initialized (step S510) so as to reset the counter. For example, the control signals A4, A3, A2, A1 and A0 are respectively reset as 0, 0, 0, 0 and 0. After completing the initialization operation, the driving circuit 110 may scan different drive lines of the touch panel 120 one by one such that the sensing compensation circuit 130 and the sensing circuit 140 may correspondingly sense touch information of the different touch units 122 of the touch panel 120 through the sense lines (step S520). For example, while the driving circuit 110 scans/drives the first drive line of the touch panel 120, the controller 800 may set/adjust the equivalent resistor of the first impedance 420 as $R_{11}\|(R_{12}\|(R_{13}\|(R_{14}\|(R_{15}\|R_{16}))))$.

In step S530, whether the impedance $R_{ITO2}$ of the sense lines is changed may be checked. If the impedance $R_{ITO2}$ is not changed, step S520 is returned to. If the impedance $R_{ITO2}$ is changed, step S540 is performed. For example, when the driving circuit 110 is changed to scan/drive the second drive line from first drive line, a length (i.e., the impedance $R_{ITO2}$) of the sense lines may be changed as well. Since the impedance $R_{ITO2}$ is changed, step S540 is performed.

In step S540, may check whether touch units 122 of the touch panel 120 are sensed or not. If all the touch units 122 are sensed, the sensing operation of the touch panel 120 is completed for once. If there are still touch units 122 uncompleted, step S550 is performed. For example, when the driving circuit 110 at present selects to scan/drive the second drive line of the touch panel 120, the controller 800 plus 1 to the control signals in step S550 since there are still touch units 122 waiting for completing the sensing operation. That is, the control signals A4, A3, A2, A1 and A0 are respectively set as 0, 0, 0, 0 and 1. Therefore, the controller 800 may set/adjust the equivalent resistor $R_{eqiv}$ of the first impedance 420 as $R_{11}|(R_{12}\|(R_{13}\|(R_{14}\|(R_{15}+R_{16}))))$ so as to perform step S520 again. Accordingly, the sensing compensation circuit 130 may automatically adjust the input impedance of the negative impedance circuit 400 corresponding to dynamic change in the impedance $R_{ITO2}$ of the sense lines. Thereby, the sensing compensation circuit 130 may provide corresponding negative input impedance $-R_{eq}$ for offsetting/compensating the impedance $R_{ITO2}$ of the sense lines in spite of how the impedance $R_{ITO2}$ of the sense lines is changed.

Although in the exemplary embodiment illustrated in FIG. 4, the first impedance 420 is implemented by the variable resistor, the implementation of the sensing compensation circuit 130 should not be limited thereto. For instance, according to design requirements for different embodiments, the implementation of the second impedance 230 and/or the third impedance 240 illustrated in FIG. 4 may be embodied with reference to the related description of the first impedance 420. In another exemplary embodiment, one of the first impedance 420, the second impedance 230 and the third impedance 240 may be implemented by using a variable impedance circuit, while the rest may be implemented by using constant impedance circuits. The constant impedance circuits may be resistors, capacitors or inductors, and the variable impedance circuit may be a variable resistor, a variable capacitor or a variable inductor. In still another exemplary embodiment, two of the first impedance 420, the second impedance 230 and the third impedance 240 may be implemented by using variable impedance circuits, while the rest may be implemented by using a constant impedance circuit. In other present exemplary embodiments, all of the first impedance 420, the second impedance 230 and the third impedance 240 may be implemented by using variable impedance circuits. In other words, since the equivalent input impedance $R_{eq}$ of the negative impedance circuit 400 is expressed by $R_{eq}=-(R_1R_3)/R_2$, the negative input impedance $-R_{eq}$ of the negative impedance circuit 400 may be determined by adjusting one or more of $R_1$, $R_2$ and $R_3$.

Figure 8:
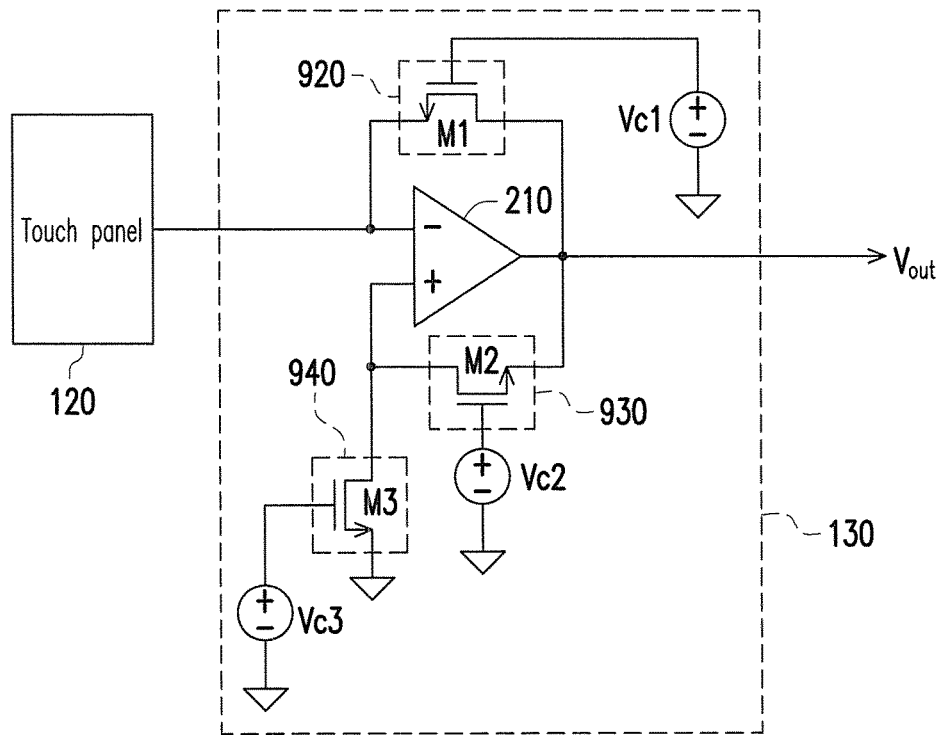
FIG. 8 is a circuit schematic diagram illustrating the sensing compensation circuit depicted in FIG. 1 according to yet another exemplary embodiment of the disclosure.

FIG. 8 is a circuit schematic diagram illustrating the sensing compensation circuit 130 depicted in FIG. 1 according to yet another exemplary embodiment of the disclosure. The sensing compensation circuit 130 illustrated in FIG. 8 may be likewise embodied with reference to the descriptions of FIG. 1 through FIG. 4. Differing from the exemplary embodiment illustrated in FIG. 4, a first impedance 920 of the negative impedance circuit illustrated in FIG. 8 includes a metal-oxide-semiconductor field effect transistor (MOSFET) M1, a second impedance 930 includes a MOSFET M2, and a third impedance 940 includes a MOSFET M3. With reference to FIG. 8, a first terminal (e.g. a source terminal) of the transistor M1 is coupled to the first input terminal of the amplifier 210. A second terminal (e.g. a drain terminal) of the transistor M1 is coupled to the output terminal of the amplifier 210. A control terminal (e.g. a gate terminal) of the transistor M1 is coupled to a control voltage $V_{c1}$. The MOSFET M1 is controlled by the control voltage $V_{c1}$ and thus, may be served as a voltage-controlled resistor, and a resistance of the first impedance 920 may adjusted by determining a voltage level of the control voltage $V_{c1}$.

A first terminal (e.g. a drain terminal) of the transistor M2 is coupled to the second input terminal of the amplifier 210. A second terminal (e.g. a source terminal) of the transistor M2 is coupled to the output terminal of the amplifier 210. A control terminal (e.g. a gate terminal) of the transistor M2 is coupled to a control voltage $V_{c2}$. The MOSFET M2 is controlled by the control voltage $V_{c2}$ and thus, may be served as a voltage-controlled resistor. A resistance of the second impedance 930 may be adjusted by determining a voltage level of the control voltage $V_{c2}$.

A first terminal (e.g. a drain terminal) of the transistor M3 is coupled to the second input terminal of the amplifier 210. A second terminal (e.g. a source terminal) of the transistor M3 is coupled to a reference voltage (e.g. a ground voltage). A control terminal (e.g. a gate terminal) of the transistor M3 is coupled to a control voltage $V_{c3}$. The MOSFET M3 is controlled by the control voltage $V_{c3}$ and thus, may be served as a voltage-controlled resistor. A resistance of the third impedance 940 may be adjusted by determining a voltage level of the control voltage $V_{c3}$. Since the equivalent input impedance $R_{eq}$ of the negative impedance circuit is expressed by $R_{eq}=-(R_1R_3)/R_2$, and thus, the negative input impedance $-R_{eq}$ of the negative impedance circuit may be determined by adjusting the resistance (i.e., $R_1$) of the first impedance 920, a resistance (i.e., $R_2$) of the second impedance 930 and/or a resistance (i.e., $R_3$) of the third impedance 940.

Figure 9:
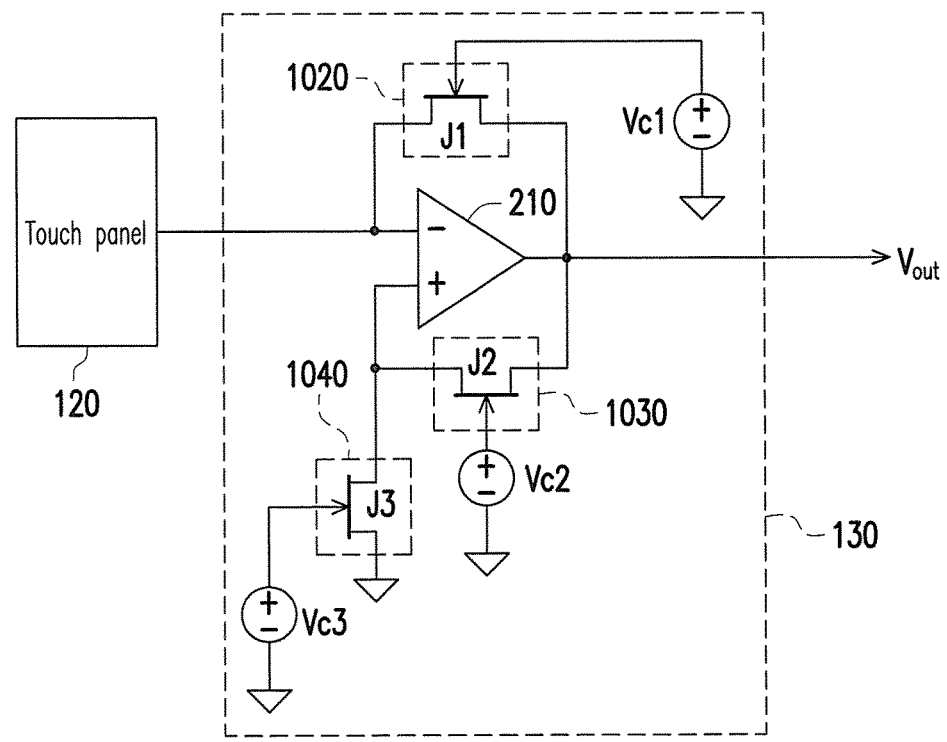
FIG. 9 is a circuit schematic diagram illustrating the sensing compensation circuit depicted in FIG. 1 according to further another exemplary embodiment of the disclosure.

FIG. 9 is a circuit schematic diagram illustrating the sensing compensation circuit 130 depicted in FIG. 1 according to further another exemplary embodiment of the disclosure. The sensing compensation circuit 130 illustrated in FIG. 9 may be likewise embodied with reference to the related descriptions of FIG. 1 through FIG. 4 and FIG. 8. Differing from the exemplary embodiment illustrated in FIG. 8, a first impedance 1020 of the negative impedance circuit illustrated in FIG. 9 includes a junction field effect transistor (JFET) J1, a second impedance 1030 includes a JFET transistor J2, and a third impedance 1040 includes a JFET J3.

With reference to FIG. 9, a first terminal (e.g. a source terminal) of the transistor J1 is coupled to the first input terminal of the amplifier 210. A second terminal (e.g. a drain terminal) of the transistor J1 is coupled to the output terminal of the amplifier 210. A control terminal (e.g. a gate terminal) of the transistor J1 is coupled to a control voltage V. The transistor J1 is controlled by the control voltage $V_{c1}$ and thus, may be served as a voltage-controlled resistor. A resistance of the first impedance 1020 may be determined by determining a voltage level of the control voltage $V_{c1}$.

A first terminal of the transistor J2 is coupled to the second input terminal of the amplifier 210. A second terminal of the transistor J2 is coupled to the output terminal of the amplifier 210. A control terminal (e.g. a gate terminal) of the transistor J2 is coupled to control voltage $V_{c2}$. The transistor J2 is controlled by the control voltage $V_{c2}$ and thus, may be served as a voltage-controlled resistor. A resistance of the second impedance 1030 may be determined by determining a voltage level of the control voltage $V_{c2}$.

A first terminal of the transistor J3 is coupled to the second input terminal of the amplifier 210. A second terminal of the transistor J3 is coupled to a reference voltage (e.g. a ground voltage). A control terminal (e.g. a gate terminal) of the transistor J3 is coupled to a control voltage $V_{c3}$. The transistor J3 is controlled by the control voltage $V_{c3}$ and thus, may be served as a voltage-controlled resistor. A resistance of the third impedance 1040 may be determined by determining a voltage level of the control voltage $V_{c3}$.

Figure 10:
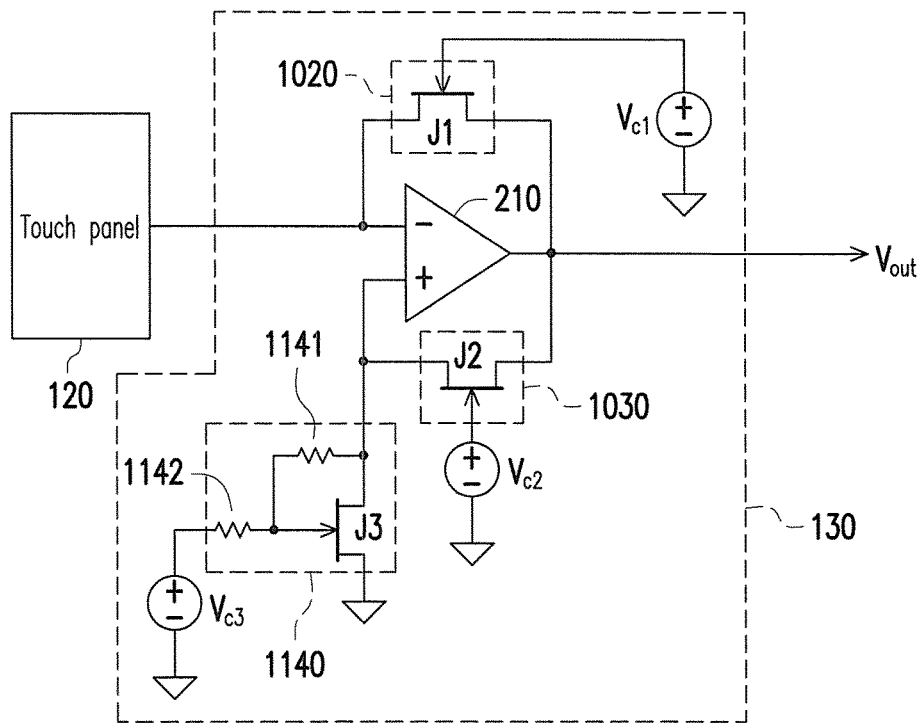
FIG. 10 is a circuit schematic diagram illustrating the sensing compensation circuit depicted in FIG. 1 according to still another exemplary embodiment of the disclosure.

FIG. 10 is a circuit schematic diagram illustrating the sensing compensation circuit 130 depicted in FIG. 1 according to still another exemplary embodiment of the disclosure. The sensing compensation circuit 130 illustrated in FIG. 10 may be likewise embodied with reference to the descriptions of FIG. 1 through FIG. 4 and FIG. 8 through FIG. 9. Differing from the exemplary embodiment illustrated in FIG. 9, a third impedance 1140 of the negative impedance circuit illustrated in FIG. 10 includes the JFET J3, a resistor 1141 and a resistor 1142. A first terminal and a second terminal of the resistor 1141 are respectively coupled to the first terminal and the control terminal of the transistor J3, which is as shown in FIG. 10. A first terminal and a second terminal of the resistor 1142 are respectively coupled to the control voltage $V_{c3}$ and the control terminal of the transistor J3. A resistance linearity of the transistor J3 served as a voltage-controlled resistor may be enhanced by using a feedback path provided by the resistor 1141.

Figure 11:
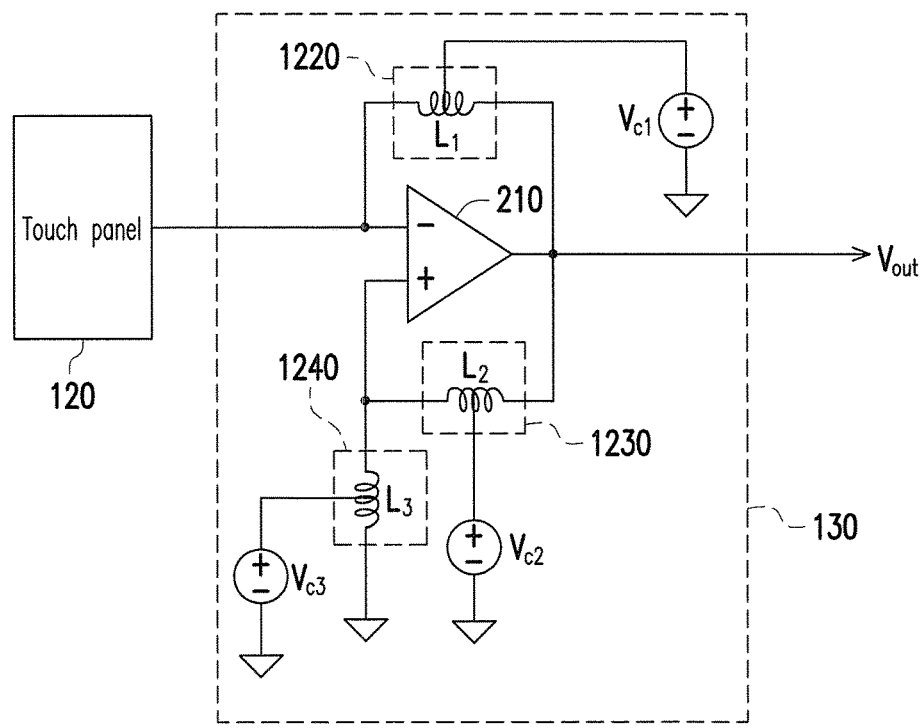
FIG. 11 is a circuit schematic diagram illustrating the sensing compensation circuit depicted in FIG. 1 according to another exemplary embodiment of the disclosure.

FIG. 11 is a circuit schematic diagram illustrating the sensing compensation circuit 130 depicted in FIG. 1 according to another exemplary embodiment of the disclosure. The sensing compensation circuit 130 illustrated in FIG. 11 may be likewise embodied with reference to FIG. 1 through FIG. 4 and FIG. 8 through FIG. 10. Differing from the exemplary embodiment illustrated in FIG. 8, in FIG. 11, the first impedance 1220, the second impedance 1230 and the third impedance 1240 are the first impedance unit comprising a variable inductor, respectively. The negative impedance circuit has a first impedance 1220 including a variable inductor $L_1$, a second impedance 1230 including a variable inductor $L_2$ and a third impedance 1240 including a variable inductor $L_3$. The inductors $L_1$, $L_2$ and $L_3$ may use microelectromechanical (MEMS) devices. For example, the MEMS devices include coils and metal plates. Through changing a distance between the coil and the metal plate, a magnetic flux around the coil may be changed, such that a level of the inductance may be indirectly changed (since an inductance is directly proportional to a change amount of the magnetic flux).

With reference to FIG. 11, a first terminal of the inductor $L_1$ is coupled to the first input terminal of the amplifier 210. A second terminal of the inductor $L_1$ is coupled to the output terminal of the amplifier 210. A control ten final of the inductor $L_1$ is coupled to the control voltage $V_{c1}$. The inductor $L_1$ is controlled by the control voltage $V_{c1}$ and thus, may be served as a voltage-controlled inductor. An inductance (an impedance) of the first impedance 1220 may be adjusted by determining the voltage level of the control voltage $V_{c1}$.

A first terminal of the inductor $L_2$ is coupled to the second input terminal of the amplifier 210. A second terminal of the inductor $L_2$ is coupled to the output terminal of the amplifier 210. A control terminal of the inductor $L_2$ is coupled to the control voltage $V_{c2}$. The inductor $L_2$ is controlled by the control voltage $V_{c2}$ and thus, may be served as a voltage-controlled inductor. An inductance (an impedance) of the second impedance 1230 may be adjusted by determining the voltage level of the control voltage $V_{c2}$.

A first terminal of the inductor $L_3$ is coupled to the second input terminal of the amplifier 210. A second terminal of the inductor $L_3$ is coupled to a reference voltage (e.g. a ground voltage). A control terminal of the inductor $L_3$ is coupled to control voltage $V_{c3}$. The inductor $L_3$ is controlled by the control voltage $V_{c3}$ and thus, may be served as a voltage-controlled inductor. An inductance (an impedance) of the third impedance 1240 may be adjusted by determining the voltage level of the control voltage $V_{c3}$. Since the equivalent input impedance $R_{eq}$ of the negative impedance circuit is expressed by $R_{eq}=-(R_1R_3)/R_2$, the negative input impedance $-R_{eq}$ of the negative impedance circuit may be determined by adjusting the impedance (i.e., $R_1$) of the first impedance 1220, the impedance (i.e., $R_2$) of the second impedance 1230 and/or the impedance (i.e., $R_3$) of the third impedance 1240.

Figure 12:
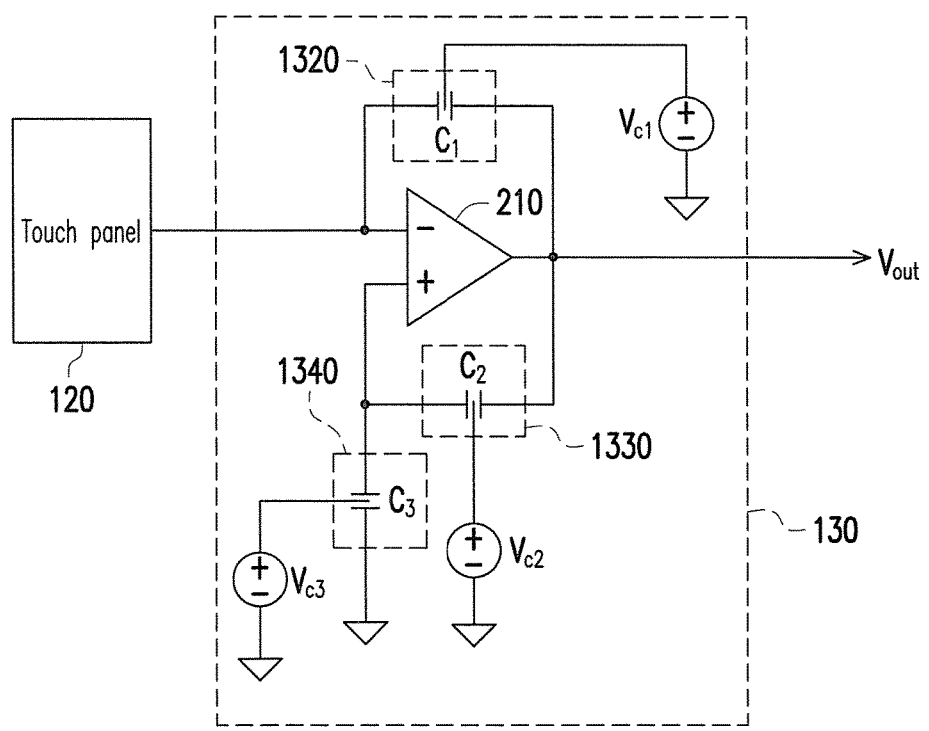
FIG. 12 is a circuit schematic diagram illustrating the sensing compensation circuit depicted in FIG. 1 according to yet another exemplary embodiment of the disclosure.

FIG. 12 is a circuit schematic diagram illustrating the sensing compensation circuit 130 depicted in FIG. 1 according to yet another exemplary embodiment of the disclosure. The sensing compensation circuit 130 illustrated in FIG. 12 may be likewise embodied with reference to FIG. 1 through FIG. 4 and FIG. 8 through FIG. 11. Differing from the exemplary embodiment illustrated in FIG. 8, in FIG. 12, the first impedance 1320, the second impedance 1330 and the third impedance 1340 are the first impedance unit comprising a variable capacitor, respectively. The negative impedance circuit has a first impedance 1320 including a variable capacitor $C_1$, a second impedance 1330 including a variable capacitor $C_2$, and a third impedance 1340 including a variable capacitor $C_3$. The capacitors $C_1$, $C_2$ and $C_3$ may use MEMS devices.

With reference to FIG. 12, a first terminal of the capacitor $C_1$ is coupled to the first input terminal of the amplifier 210. A second terminal of the capacitor $C_1$ is coupled to the output terminal of the amplifier 210. A control terminal of the capacitor $C_1$ is coupled to control voltage $V_{c1}$. The capacitor $C_1$ is controlled by the control voltage $V_{c1}$ and thus, may be served as a voltage-controlled capacitor. A capacitance (an impedance) of the first impedance 1320 may be adjusted by determining the voltage level of the control voltage $V_{c1}$.

A first terminal of the capacitor $C_2$ is coupled to the second input terminal of the amplifier 210. A second terminal of the capacitor $C_2$ is coupled to the output terminal of the amplifier 210. A control terminal of the capacitor $C_2$ is coupled to control voltage $V_{c2}$. The capacitor $C_2$ is controlled by the control voltage $V_{c2}$ and thus, may be served as a voltage-controlled capacitor. A capacitance (an impedance) of the second impedance 1330 may be adjusted by determining the voltage level of the control voltage $V_{c2}$.

A first terminal of the capacitor $C_3$ is coupled to the second input terminal of the amplifier 210. A second terminal of the capacitor $C_3$ is coupled to a reference voltage (e.g. a ground voltage). A control terminal of the capacitor $C_3$ is coupled to the control voltage $V_{c3}$. The capacitor $C_3$ is controlled by the control voltage $V_{c3}$ and thus, may be served as a voltage-controlled capacitor. A capacitance (an impedance) of the third impedance 1340 may be adjusted by determining the voltage level of the control voltage $V_{c3}$. Since the equivalent input impedance $R_{eq}$ of the negative impedance circuit is expressed by $R_{eq}=-(R_1R_3)/R_2$, the negative input impedance $-R_{eq}$ of the negative impedance circuit may be determined by adjusting an impedance (i.e., $R_1$) of the first impedance 1320, an impedance (i.e., $R_2$) of the second impedance 1330 and/or an impedance (i.e., $R_3$) of the third impedance 1340.

Figure 13:
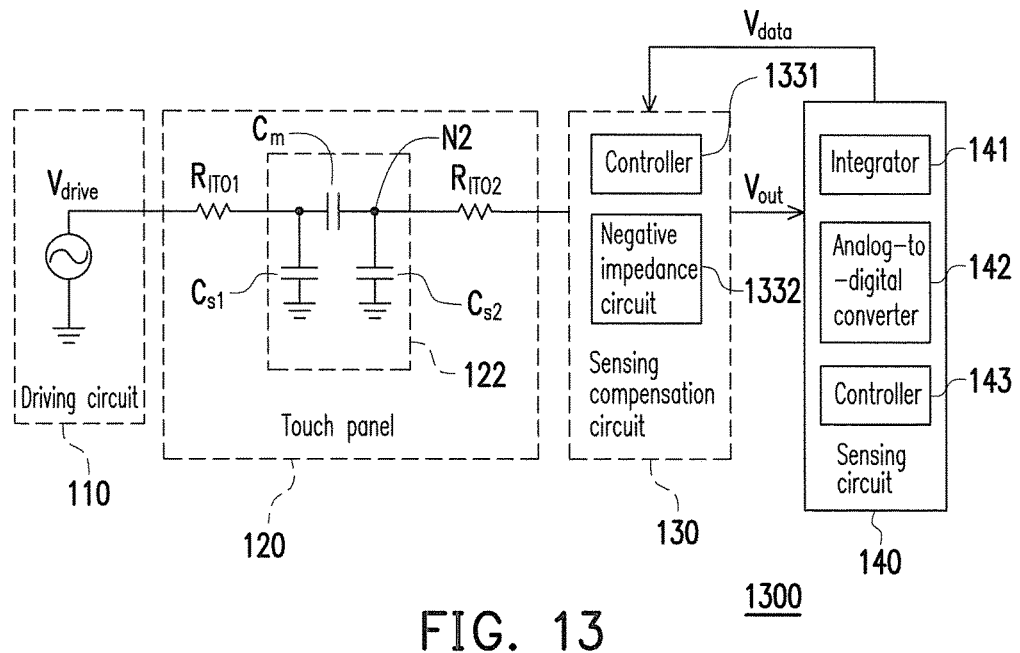
FIG. 13 is a circuit schematic block view showing a touch device according to yet another exemplary embodiment of the disclosure.

The sensing compensation circuit 130 may automatically adjust the compensation-impedance of the sensing compensation circuit 130 according to touch information of the sensing circuit 140 or a physical feature of the touch panel 120. For instance, FIG. 13 is a circuit schematic block view showing a touch device 1300 according to yet another exemplary embodiment of the disclosure. The exemplary embodiment illustrated in FIG. 13 may be likewise embodied with reference to the related descriptions of FIG. 1 through FIG. 12. In the exemplary embodiment illustrated in FIG. 13, the sensing compensation circuit 130 further automatically adjusts the compensation-impedance of the sensing compensation circuit 130 according to the touch information of the sensing circuit 140. To be more detailed, the sensing compensation circuit 130 includes a controller 1331 and a negative impedance circuit 1332. The negative impedance circuit 1332 illustrated in FIG. 13 may be likewise embodied with reference to the negative impedance circuit 200 illustrated in FIG. 2 and FIG. 3, the negative impedance circuit 400 illustrated in FIG. 4 through FIG. 6 and/or the related descriptions of FIG. 8 through FIG. 12. According to touch information $V_{data}$ of the sensing circuit 140 or the physical feature of the touch panel 120, the controller 1331 may automatically control/adjust a compensation-impedance (e.g. an input impedance) of the negative impedance circuit 1332. The touch information $V_{data}$ may be a coordinate axis, a digital signal or an analog signal. The physical feature of the touch panel 120 includes electrical features of the touch panel 120 or change in the electrical features of the touch panel 120 resulted from change of panel type or temperature or humidity change of an environment where the touch panel 120 is located. The electrical feature of the touch panel 120 includes resistance or capacitance, for example. In spit of the electrical features of the touch panel 120 itself or the electrical features of the touch panel 120 being changed due by change in the external conditions (e.g. change in the panel type, change in the temperature and/or the humidity change of an environment where the touch panel 120 is located), An automated compensating function of the sensing compensation circuit 130 would automatically compensate the features of the touch panel 120. For instance, when the touch information $V_{data}$ shows that a touch-sensing result of the sensing circuit 140 exceeds a tolerable range, the controller 1331 may keep increasing/decreasing the input impedance of the negative impedance circuit 1332 for a level until the touch-sensing result of the sensing circuit 140 falls within the tolerable range.

Figure 14:
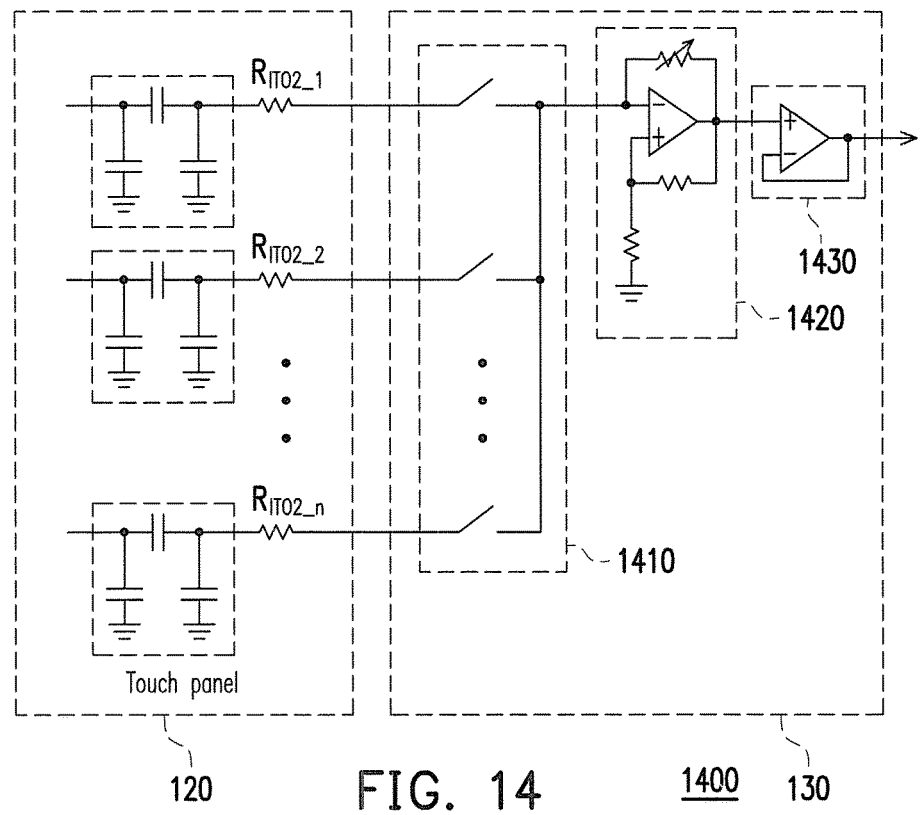
FIG. 14 is a circuit schematic block view showing a touch device according to still another exemplary embodiment of the disclosure.

FIG. 14 is a circuit schematic block view showing a touch device 1400 according to still another exemplary embodiment of the disclosure. The exemplary embodiment illustrated in FIG. 14 may be likewise embodied with reference to the related descriptions of FIG. 1 through FIG. 13. In the exemplary embodiment illustrated in FIG. 14, the sensing compensation circuit 130 includes a multiplex circuit 1410, a negative impedance circuit 1420 and a buffer 1430. The negative impedance circuit 1420 illustrated in FIG. 14 may be likewise embodied with reference to the negative impedance circuit 200 illustrated in FIG. 2 and FIG. 3, the negative impedance circuit 400 illustrated in FIG. 4 through FIG. 6 and/or the related descriptions of FIG. 8 through FIG. 12. The buffer 1430 illustrated in FIG. 14 may be likewise embodied with reference to the buffer 300 illustrated in FIG. 3 through FIG. 4.

With reference to FIG. 14, the touch panel 120 is disposed with a plurality of sense lines, and the sense lines respectively have impedance $R_{ITO2\_1}$, $R_{ITO2\_2}$, and $R_{ITO2\_n}$. The impedance $R_{ITO2\_1} \sim R_{ITO2\_n}$ illustrated in FIG. 14 may be likewise embodied with reference to the related description of the impedance $R_{ITO2}$ of the sense lines illustrated in FIG. 1. A plurality of select terminals of the multiplex circuit 1410 is respectively coupled to the sense lines of the touch panel 120 in a one-to-one manner. An input terminal of the negative impedance circuit 1420 is coupled to a common terminal of the multiplex circuit 1410 to provide the compensation-impedance. By a switching operation of the multiplex circuit 1410, the negative impedance circuit 1420 may timingly provides the compensation-impedance to the sense lines to offset/compensate the impedance $R_{ITO2\_1} \sim R_{ITO2\_n}$. In another exemplary embodiment, the exemplary embodiment illustrated in FIG. 14 may also be combined with the automated compensating function of the exemplary embodiment illustrated in FIG. 13. That is to say, based on the control of the controller, the negative impedance circuit 1420 may provide different compensation-impedance corresponding to the sense lines through the multiplex circuit 1410 so as to offset/compensate the impedance $R_{ITO2\_1} \sim R_{ITO2\_n}$. Accordingly, different sense lines of the touch panel 120 may share the negative impedance circuit 1420.

FIG. 15 is a schematic diagram showing a resistance controlling process of a compensation-impedance according to an exemplary embodiment of the disclosure. With reference to FIG. 15, before scanning and sensing the touch panel 120, the sensing compensation circuit 130 may be initialized (step S510). After completing the initialization operation, may scan different drive lines of the touch panel 120 one by one, such that the sensing compensation circuit 130 and the sensing circuit 140 may correspondingly sense touch information of the different touch units 122 of the touch panel 120 through the sense lines (step S520). For instance, in step S520, while the driving circuit 110 scans/drives the first drive line of the touch panel 120, the sensing compensation circuit 130 may correspondingly set/adjust the resistance of the first impedance $R_1$, the resistance of the second impedance $R_2$ and/or the resistance of the third impedance $R_3$ of the negative impedance circuit so as to set the compensation-impedance of the sensing compensation circuit 130.

After completing step S520, step S530 follows. In step S530, whether the impedance $R_{ITO2}$ of the sense lines is changed may be checked. For example, the sensing compensation circuit 130 may infer whether the impedance $R_{ITO2}$ of the sense lines is changed according to the touch information of the sensing circuit 140. Alternatively, the sensing compensation circuit 130 may infer whether the impedance $R_{ITO2}$ of the sense lines is changed according to driving operations of the driving circuit 110 on different drive lines. If the impedance $R_{ITO2}$ is not changed, step S520 is returned to. If the impedance $R_{ITO2}$ is changed, step S540 performed. For example, when the driving circuit 110 is changed to scan/drive the second drive line from first drive line, a length (i.e., the impedance $R_{ITO2}$) of the sense line may be changed as well. Since the impedance $R_{ITO2}$ is changed, step S540 is performed.

In step S540, may check whether touch units 122 of the touch panel 120 are sensed. If all the touch units 122 are sensed, the sensing operation of the touch panel 120 is completed for once. If there are still touch units 122 uncompleted, step S550 is performed to correspondingly adjust the compensation-impedance of the sensing compensation circuit 130. For example, when the driving circuit 110 at present selects to scan/drive the second drive line of the touch panel 120, the sensing compensation circuit 130 may change to set/adjust the compensation-impedance of the negative impedance circuit from a first resistance level to a second resistance level in step S550 since there are still touch unit 122 waiting for completing the sensing operation, such that step S520 is performed.

Accordingly, the sensing compensation circuit 130 may automatically adjust the compensation-impedance thereof correspondingly to dynamic change in the impedance $R_{ITO2}$ of the sense lines. Thereby, the sensing compensation circuit 130 may provide the corresponding negative input impedance $-R_{eq}$ for offsetting/compensating the impedance $R_{ITO2}$ of the sense lines in spite of how the impedance $R_{ITO2}$ of the sense lines is changed.

In light of the foregoing, the disclosure introduces that the sensing compensation circuit 130 with negative resistance features may be used as a load of a sensing terminal of the touch panel 120, such that the limitations of the bandwidth resulted from the parasitic resistance (e.g. the impedance $R_{ITO2}$) and the parasitic capacitance (e.g. $C_{s2}$) of the sense lines may be reduced, the sensitivity for the entire sensing compensation circuit 130 sensing change of a mutual capacitance $C_m$ may be enhanced, and thereby the SNR of the sensing signal may be increased.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A touch device, comprising:
   a touch panel;
   a sensing compensation circuit, having a sensing terminal coupled to a sense line of the touch panel, and providing a compensation-impedance according to features of the touch panel, wherein the compensation-impedance is a negative input impedance; and
   a sensing circuit, having an input terminal coupled to an output terminal of the sensing compensation circuit to sense touch information of a touch unit coupled to the sense line in the touch panel via the sensing compensation circuit, and receiving the touch information compensated by the sensing compensation circuit,
   wherein the sensing compensation circuit comprises a negative impedance circuit having an input terminal coupled to the touch panel and an output terminal providing touch information of the touch unit of the touch panel, wherein the input terminal of the negative impedance circuit provides the negative input impedance, wherein an absolute value of the negative input impedance falls within an impedance range defined according to an impedance of the sense line of the touch panel, and the negative impedance circuit comprises:
      an amplifier, having an inverted input terminal coupled to the input terminal of the negative impedance circuit and an output terminal coupled to the output terminal of the negative impedance circuit;
      a first impedance, having a first terminal and a second terminal respectively coupled to the inverted input terminal and the output terminal of the amplifier;
      a second impedance, having a first terminal and a second terminal respectively coupled to a non-inverted input terminal and the output terminal of the amplifier; and
      a third impedance, having a first terminal and a second terminal respectively coupled to the non-inverted input terminal of the amplifier and a reference voltage.

2. The touch device according to claim 1, wherein the sensing circuit comprises an integrator, an analog-to-digital converter and a controller.

3. The touch device according to claim 1, wherein the absolute value of the negative input impedance is equal to the impedance of the sense line of the touch panel.

4. The touch device according to claim 1, wherein the sensing compensation circuit further comprises:
   a buffer, having an input terminal coupled to the output terminal of the negative impedance circuit.

5. The touch device according to claim 1, wherein one of the first impedance, the second impedance and the third impedance is a first impedance unit, a second impedance unit, a third impedance unit or a fourth impedance unit, wherein
   the first impedance unit comprises:
      a resistor, a variable resistor, a capacitor, a variable capacitor, an inductor or a variable inductor;
   the second impedance unit comprises:
      a plurality of switches, wherein first terminals of the switches are jointly coupled to the first input terminal of the amplifier; and
      a plurality of resistors, wherein first terminals of the resistors respectively coupled to second terminals of the switches in a one-to-one manner, and second terminals of the resistors are jointly coupled to the output terminal of the amplifier;

the third impedance unit comprises:
  a transistor, having a first terminal coupled to the first input terminal of the amplifier and a second terminal coupled to the output terminal of the amplifier; and the fourth impedance unit comprises:
  a plurality of controllable resistance units, wherein a first terminal of a nth controllable resistance unit in the controllable resistance units is coupled to a second terminal of a n-1th controllable resistance unit in the controllable resistance units, a first terminal of a first controllable resistance unit in the controllable resistance units is coupled to the first input terminal of the amplifier, and third terminals of the controllable resistance units are jointly coupled to the output terminal of the amplifier; and
  a first resistor, a first terminal of the first resistor is coupled to a second terminal of the last controllable resistance unit in the controllable resistance units, and a second terminal of the first resistor is coupled to the output terminal of the amplifier.

6. The touch device according to claim 5, wherein one of the controllable resistance units comprises:
  a second resistor, having a first terminal served as the first terminal of the controllable resistance unit;
  a first multiplexer, having a common terminal coupled to a second terminal of the second resistor, and a first select terminal served as the third terminal of the controllable resistance unit; and
  a second multiplexer, having a first select terminal coupled to the first terminal of the second resistor, a second select terminal coupled to a second select terminal of the first multiplexer, and a common terminal of the second multiplexer served as the second terminal of the controllable resistance unit.

7. The touch device according to claim 1, wherein the sensing compensation circuit further comprises
  a controller,
  the input terminal of the negative impedance circuit is coupled to the sense line of the touch panel to provide the compensation-impedance, the controller controls the negative impedance circuit to correspondingly adjust the compensation-impedance according to the touch information of the sensing circuit or a physical feature of the touch panel.

8. The touch device according to claim 7, wherein the touch information of the sensing circuit is a coordinate axis, a digital signal or an analog signal.

9. The touch device according to claim 7, wherein the physical feature comprises electrical features of the touch panel or change in the electrical features of the touch panel resulted from change of panel type, temperature or humidity change of an environment where the touch panel is located.

10. The touch device according to claim 1, wherein the sensing compensation circuit further comprises:
  a multiplex circuit, having a plurality of select terminals respectively coupled to a plurality of sense lines of the touch panel in a one-to-one manner;
  wherein the input terminal of the negative impedance circuit is coupled to a common terminal of the multiplex circuit to provide the compensation-impedance.

11. A sensing compensation method for a touch device, comprising:
  providing a touch panel;
  providing a compensation-impedance by a sensing compensation circuit according to features of the touch panel, wherein the compensation-impedance is a negative input impedance, to compensate an impedance of a sense line of the touch panel; and
  sensing, by a sensing circuit, touch information of a touch unit coupled to the sense line in the touch panel via the sensing compensation circuit, wherein the touch information is compensated by the sensing compensation circuit,
  wherein the sensing compensation circuit comprises a negative impedance circuit having an input terminal coupled to the touch panel and an output terminal providing touch information of the touch unit of the touch panel, wherein the input terminal of the negative impedance circuit provides the negative input impedance, an absolute value of the negative input impedance falls within an impedance range defined according to an impedance of the sense line, and the negative impedance circuit comprises:
    an amplifier, having an inverted input terminal coupled to the input terminal of the negative impedance circuit and an output terminal coupled to the output terminal of the negative impedance circuit;
    a first impedance, having a first terminal and a second terminal respectively coupled to the inverted input terminal and the output terminal of the amplifier;
    a second impedance, having a first terminal and a second terminal respectively coupled to a non-inverted input terminal and the output terminal of the amplifier; and
    a third impedance, having a first terminal and a second terminal respectively coupled to the non-inverted input terminal of the amplifier and a reference voltage, and
  wherein a sensing terminal of the sensing compensation circuit is coupled to the sense line of the touch panel, and a output terminal of the sensing compensation circuit is coupled to an input terminal of the sensing circuit.

12. The method according to claim 11, wherein the absolute value of the negative input impedance is equal to the impedance of the sense line.

13. The method according to claim 11, wherein the step of providing the compensation-impedance comprises:
  correspondingly adjusting the compensation-impedance by the sensing compensation circuit according to the touch information of the sensing circuit or a physical feature of the touch panel.

14. The method according to claim 13, wherein the touch information of the sensing circuit is a coordinate axis, a digital signal or an analog signal.

15. The method according to claim 13, wherein the physical feature comprises electrical features of the touch panel or change in the electrical features of the touch panel resulted from change of panel type, temperature or humidity change of an environment where the touch panel is located.

16. The method according to claim 11, further comprising:
  checking whether the impedance of the sense line of the touch panel is changed;
  if the impedance of the sense line is changed, correspondingly adjusting the compensation-impedance.

17. A touch device, comprising:
  a touch panel;
  a sensing compensation circuit, having a sensing terminal coupled to a sense line of the touch panel, and providing a compensation-impedance according to features of the touch panel, wherein the compensation-impedance is a negative input impedance; and a sensing circuit, having an input terminal coupled to an output terminal of the sensing compensation circuit to sense touch information of a touch unit coupled to the sense line in the touch panel via the sensing compensation circuit, and receiving the touch information compensated by the sensing compensation circuit, wherein the sensing compensation circuit comprises a negative impedance circuit, having an input terminal coupled to the touch panel and an output terminal providing touch information of the touch unit of the touch panel, wherein the input terminal of the negative impedance circuit provides the negative input impedance, an absolute value of the negative input impedance falls within an impedance range defined according to an impedance of a sense line of the touch panel, and the negative impedance circuit is a first negative impedance circuit, a second negative impedance circuit or a third negative impedance circuit, wherein the first negative impedance circuit comprises:
an amplifier, having an inverted input terminal coupled to the input terminal of the negative impedance circuit, and an output ten iinal coupled to the output terminal of the negative impedance circuit ;
a first transistor, having a first terminal and a second terminal respectively coupled to the inverted input terminal and the output terminal of the amplifier;
a second transistor, having a first terminal and a second terminal respectively coupled to a non-inverted input terminal and the output terminal of the amplifier; and
a third transistor, having a first terminal and a second terminal respectively coupled to the non-inverted input terminal of the amplifier and a reference voltage;

the second negative impedance circuit comprises:
an amplifier, having an inverted input terminal coupled to the input terminal of the negative impedance circuit and an output terminal coupled to the output terminal of the negative impedance circuit;
a first variable inductor, having a first terminal and a second terminal respectively coupled to the inverted input terminal and the output terminal of the amplifier;
a second variable inductor, having a first terminal and a second terminal respectively coupled to a non-inverted input terminal and the output terminal of the amplifier; and
a third variable inductor, having a first terminal and a second terminal respectively coupled to the non-inverted input terminal of the amplifier and a reference voltage; and the third negative impedance circuit comprises:
an amplifier, having an inverted input terminal coupled to the input terminal of the negative impedance circuit and an output terminal coupled to the output terminal of the negative impedance circuit;
a first variable capacitor, having a first terminal and a second terminal respectively coupled to the inverted input terminal and the output terminal of the amplifier;
a second variable capacitor, having a first terminal and a second terminal respectively coupled to a non-inverted input terminal and the output terminal of the amplifier; and
a third variable capacitor, having a first terminal and a second terminal respectively coupled to the non-inverted input terminal of the amplifier and a reference voltage.

18. The touch device according to claim 17, wherein the sensing circuit comprises an integrator, an analog-to-digital converter and a controller.

19. The touch device according to claim 17, wherein the absolute value of the negative input impedance is equal to the impedance of the sense line of the touch panel.

20. The touch device according to claim 17, wherein the sensing compensation circuit further comprises:
a buffer, having an input terminal coupled to the output terminal of the negative impedance circuit.

21. The touch device according to claim 17, wherein the first negative impedance circuit further comprises:
a first resistor, having a first terminal and a second terminal respectively coupled to the first terminal and a control terminal of the third transistor; and
a second resistor, having a first terminal and a second terminal respectively coupled to a control voltage and the control terminal of the third transistor.

22. The touch device according to claim 17, wherein the sensing compensation circuit further comprises a controller, the input terminal of the negative impedance circuit is coupled to a sense line of the touch panel to provide the compensation-impedance, wherein the controller controls the negative impedance circuit to correspondingly adjust the compensation-impedance according to the touch information of the sensing circuit or a physical feature of the touch panel.

23. The touch device according to claim 22, wherein the touch information of the sensing circuit is a coordinate axis, a digital signal or an analog signal.

24. The touch device according to claim 22, wherein the physical feature comprises electrical features of the touch panel or change in the electrical features of the touch panel resulted from change of panel type, temperature or humidity change of an environment where the touch panel is located.

25. The touch device according to claim 17, wherein the sensing compensation circuit further comprises:
a multiplex circuit, having a plurality of select terminals respectively coupled to a plurality of sense lines of the touch panel in a one-to-one manner;
wherein the input terminal of the negative impedance circuit is coupled to a common terminal of the multiplex circuit to provide the compensation-impedance.

* * * * *